United States Patent
Shinozaki et al.

(10) Patent No.: US 6,288,631 B1
(45) Date of Patent: Sep. 11, 2001

(54) POWER-LINE CARRIER COMMUNICATIONS SYSTEM

(75) Inventors: Satoshi Shinozaki, Yokohama; Masahiro Maki, Iduka; Yuji Igata, Tsukushino, all of (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/456,495

(22) Filed: Dec. 8, 1999

(30) Foreign Application Priority Data

Dec. 8, 1998 (JP) .................................................. 10-348534

(51) Int. Cl.[7] .................................................. H04M 11/04
(52) U.S. Cl. ................................ 340/310.01; 340/310.02; 371/43
(58) Field of Search .......................... 340/310.01, 310.02, 340/310.03, 310.06; 375/259, 262; 371/43

(56) References Cited

U.S. PATENT DOCUMENTS

| | | | |
|---|---|---|---|
| 5,185,591 | * | 2/1993 | Shuey ................................ 340/310 A |
| 5,243,627 | * | 9/1993 | Betts et al. ............................. 375/39 |
| 5,535,220 | * | 7/1996 | Kanno et al. .......................... 371/2.1 |
| 5,596,604 | * | 1/1997 | Cioffi et al. ............................. 371/43 |
| 5,844,949 | * | 12/1998 | Hershey et al. ................. 340/310.01 |
| 6,005,477 | * | 12/1999 | Deck et al. ...................... 340/310.02 |

* cited by examiner

Primary Examiner—Daniel J. Wu
Assistant Examiner—John Tweel, Jr.
(74) Attorney, Agent, or Firm—Wenderoth, Lind & Ponack, L.L.P.

(57) ABSTRACT

An object of the present invention is to provide a reliable power-line carrier communications system having a resistance to high-level impulse noise synchronized with power-cycle frequency in virtue of redundancy on both time and frequency axes.

An interleave part (11) shuffles, in n interleaving ways, transmitting symbols in a unit of symbol stream of the same length as a noise cycle. A modulation part (12) modulates the n-type symbol streams with n-piece carriers. A demodulation part (22) extracts amplitude/phase information from each of the n-piece carriers, and then outputs the information as amplitude/phase information streams. A de-interleave part (23) unshuffles the amplitude/phase information streams. A determination part (24) determines a symbol value from amplitude/phase information values in the same timing in the amplitude/phase information streams, and then outputs the values in a receiving symbol stream.

40 Claims, 11 Drawing Sheets

F I G. 2

| CARRIER FREQUENCY | SYMBOL STREAM | | | | | | | | | | | | | | | | |
|---|---|---|---|---|---|---|---|---|---|---|---|---|---|---|---|---|---|
| 115.2kHz | 1-5 | 6-10 | 11-15 | 16-20 | 21-25 | 26-30 | 31-35 | 36-40 | 41-45 | 46-50 | 51-55 | 56-60 | 61-65 | 66-70 | 71-75 | 76-80 |
| 134.4kHz | 6-10 | 11-15 | 16-20 | 21-25 | 26-30 | 31-35 | 36-40 | 41-45 | 46-50 | 51-55 | 56-60 | 61-65 | 66-70 | 71-75 | 76-80 | 1-5 |
| 153.6kHz | 11-15 | 16-20 | 21-25 | 26-30 | 31-35 | 36-40 | 41-45 | 46-50 | 51-55 | 56-60 | 61-65 | 66-70 | 71-75 | 76-80 | 1-5 | 6-10 |
| 172.8kHz | 16-20 | 21-25 | 26-30 | 31-35 | 36-40 | 41-45 | 46-50 | 51-55 | 56-60 | 61-65 | 66-70 | 71-75 | 76-80 | 1-5 | 6-10 | 11-15 |
| 192.0kHz | 21-25 | 26-30 | 31-35 | 36-40 | 41-45 | 46-50 | 51-55 | 56-60 | 61-65 | 66-70 | 71-75 | 76-80 | 1-5 | 6-10 | 11-15 | 16-20 |
| 211.2kHz | 26-30 | 31-35 | 36-40 | 41-45 | 46-50 | 51-55 | 56-60 | 61-65 | 66-70 | 71-75 | 76-80 | 1-5 | 6-10 | 11-15 | 16-20 | 21-25 |
| 230.4kHz | 31-35 | 36-40 | 41-45 | 46-50 | 51-55 | 56-60 | 61-65 | 66-70 | 71-75 | 76-80 | 1-5 | 6-10 | 11-15 | 16-20 | 21-25 | 26-30 |
| 249.6kHz | 36-40 | 41-45 | 46-50 | 51-55 | 56-60 | 61-65 | 66-70 | 71-75 | 76-80 | 1-5 | 6-10 | 11-15 | 16-20 | 21-25 | 26-30 | 31-35 |
| 268.8kHz | 41-45 | 46-50 | 51-55 | 56-60 | 61-65 | 66-70 | 71-75 | 76-80 | 1-5 | 6-10 | 11-15 | 16-20 | 21-25 | 26-30 | 31-35 | 36-40 |
| 288.0kHz | 46-50 | 51-55 | 56-60 | 61-65 | 66-70 | 71-75 | 76-80 | 1-5 | 6-10 | 11-15 | 16-20 | 21-25 | 26-30 | 31-35 | 36-40 | 41-45 |
| 307.2kHz | 51-55 | 56-60 | 61-65 | 66-70 | 71-75 | 76-80 | 1-5 | 6-10 | 11-15 | 16-20 | 21-25 | 26-30 | 31-35 | 36-40 | 41-45 | 46-50 |
| 326.4kHz | 56-60 | 61-65 | 66-70 | 71-75 | 76-80 | 1-5 | 6-10 | 11-15 | 16-20 | 21-25 | 26-30 | 31-35 | 36-40 | 41-45 | 46-50 | 51-55 |
| 345.6kHz | 61-65 | 66-70 | 71-75 | 76-80 | 1-5 | 6-10 | 11-15 | 16-20 | 21-25 | 26-30 | 31-35 | 36-40 | 41-45 | 46-50 | 51-55 | 56-60 |
| 364.8kHz | 66-70 | 71-75 | 76-80 | 1-5 | 6-10 | 11-15 | 16-20 | 21-25 | 26-30 | 31-35 | 36-40 | 41-45 | 46-50 | 51-55 | 56-60 | 61-65 |
| 384.0kHz | 71-75 | 76-80 | 1-5 | 6-10 | 11-15 | 16-20 | 21-25 | 26-30 | 31-35 | 36-40 | 41-45 | 46-50 | 51-55 | 56-60 | 61-65 | 66-70 |
| 403.2kHz | 76-80 | 1-5 | 6-10 | 11-15 | 16-20 | 21-25 | 26-30 | 31-35 | 36-40 | 41-45 | 46-50 | 51-55 | 56-60 | 61-65 | 66-70 | 71-75 |

F I G. 3

| CARRIER FREQUENCY | SYMBOL STREAM | | | | | | | | | | | | | | | | |
|---|---|---|---|---|---|---|---|---|---|---|---|---|---|---|---|---|---|
| 115.2kHz | 1-5 | 6-10 | 11-15 | 16-20 | 21-25 | 26-30 | 31-35 | 36-40 | 41-45 | 46-50 | 51-55 | 56-60 | 61-65 | 66-70 | 71-75 | 76-80 |
| 134.4kHz | 66-70 | 71-75 | 76-80 | 1-5 | 6-10 | 11-15 | 16-20 | 21-25 | 26-30 | 31-35 | 36-40 | 41-45 | 46-50 | 51-55 | 56-60 | 61-65 |
| 153.6kHz | 51-55 | 56-60 | 61-65 | 66-70 | 71-75 | 76-80 | 1-5 | 6-10 | 11-15 | 16-20 | 21-25 | 26-30 | 31-35 | 36-40 | 41-45 | 46-50 |
| 172.8kHz | 36-40 | 41-45 | 46-50 | 51-55 | 56-60 | 61-65 | 66-70 | 71-75 | 76-80 | 1-5 | 6-10 | 11-15 | 16-20 | 21-25 | 26-30 | 31-35 |
| 192.0kHz | 21-25 | 26-30 | 31-35 | 36-40 | 41-45 | 46-50 | 51-55 | 56-60 | 61-65 | 66-70 | 71-75 | 76-80 | 1-5 | 6-10 | 11-15 | 16-20 |
| 211.2kHz | 6-10 | 11-15 | 16-20 | 21-25 | 26-30 | 31-35 | 36-40 | 41-45 | 46-50 | 51-55 | 56-60 | 61-65 | 66-70 | 71-75 | 76-80 | 1-5 |
| 230.4kHz | 71-75 | 76-80 | 1-5 | 6-10 | 11-15 | 16-20 | 21-25 | 26-30 | 31-35 | 36-40 | 41-45 | 46-50 | 51-55 | 56-60 | 61-65 | 66-70 |
| 249.6kHz | 56-60 | 61-65 | 66-70 | 71-75 | 76-80 | 1-5 | 6-10 | 11-15 | 16-20 | 21-25 | 26-30 | 31-35 | 36-40 | 41-45 | 46-50 | 51-55 |
| 268.8kHz | 41-45 | 46-50 | 51-55 | 56-60 | 61-65 | 66-70 | 71-75 | 76-80 | 1-5 | 6-10 | 11-15 | 16-20 | 21-25 | 26-30 | 31-35 | 36-40 |
| 288.0kHz | 26-30 | 31-35 | 36-40 | 41-45 | 46-50 | 51-55 | 56-60 | 61-65 | 66-70 | 71-75 | 76-80 | 1-5 | 6-10 | 11-15 | 16-20 | 21-25 |
| 307.2kHz | 11-15 | 16-20 | 21-25 | 26-30 | 31-35 | 36-40 | 41-45 | 46-50 | 51-55 | 56-60 | 61-65 | 66-70 | 71-75 | 76-80 | 1-5 | 6-10 |
| 326.4kHz | 76-80 | 1-5 | 6-10 | 11-15 | 16-20 | 21-25 | 26-30 | 31-35 | 36-40 | 41-45 | 46-50 | 51-55 | 56-60 | 61-65 | 66-70 | 71-75 |
| 345.6kHz | 61-65 | 66-70 | 71-75 | 76-80 | 1-5 | 6-10 | 11-15 | 16-20 | 21-25 | 26-30 | 31-35 | 36-40 | 41-45 | 46-50 | 51-55 | 56-60 |
| 364.8kHz | 46-50 | 51-55 | 56-60 | 61-65 | 66-70 | 71-75 | 76-80 | 1-5 | 6-10 | 11-15 | 16-20 | 21-25 | 26-30 | 31-35 | 36-40 | 41-45 |
| 384.0kHz | 31-35 | 36-40 | 41-45 | 46-50 | 51-55 | 56-60 | 61-65 | 66-70 | 71-75 | 76-80 | 1-5 | 6-10 | 11-15 | 16-20 | 21-25 | 26-30 |
| 403.2kHz | 16-20 | 21-25 | 26-30 | 31-35 | 36-40 | 41-45 | 46-50 | 51-55 | 56-60 | 61-65 | 66-70 | 71-75 | 76-80 | 1-5 | 6-10 | 11-15 |

FIG. 6A
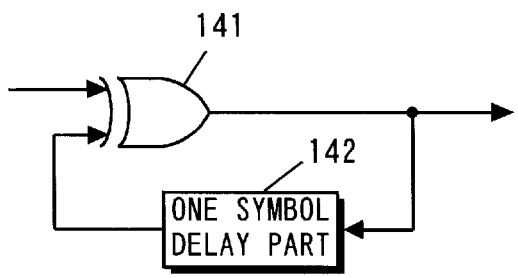
FIG. 6B
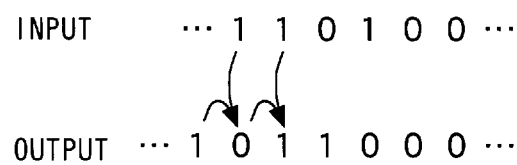
FIG. 6C
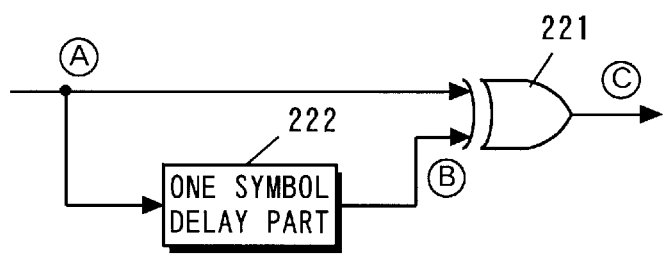
FIG. 6D
Ⓐ  ···1 0 1 1 0 0 0···
Ⓑ      ···1 0 1 1 0 0 0···
Ⓒ  ···1 1 0 1 0 0···

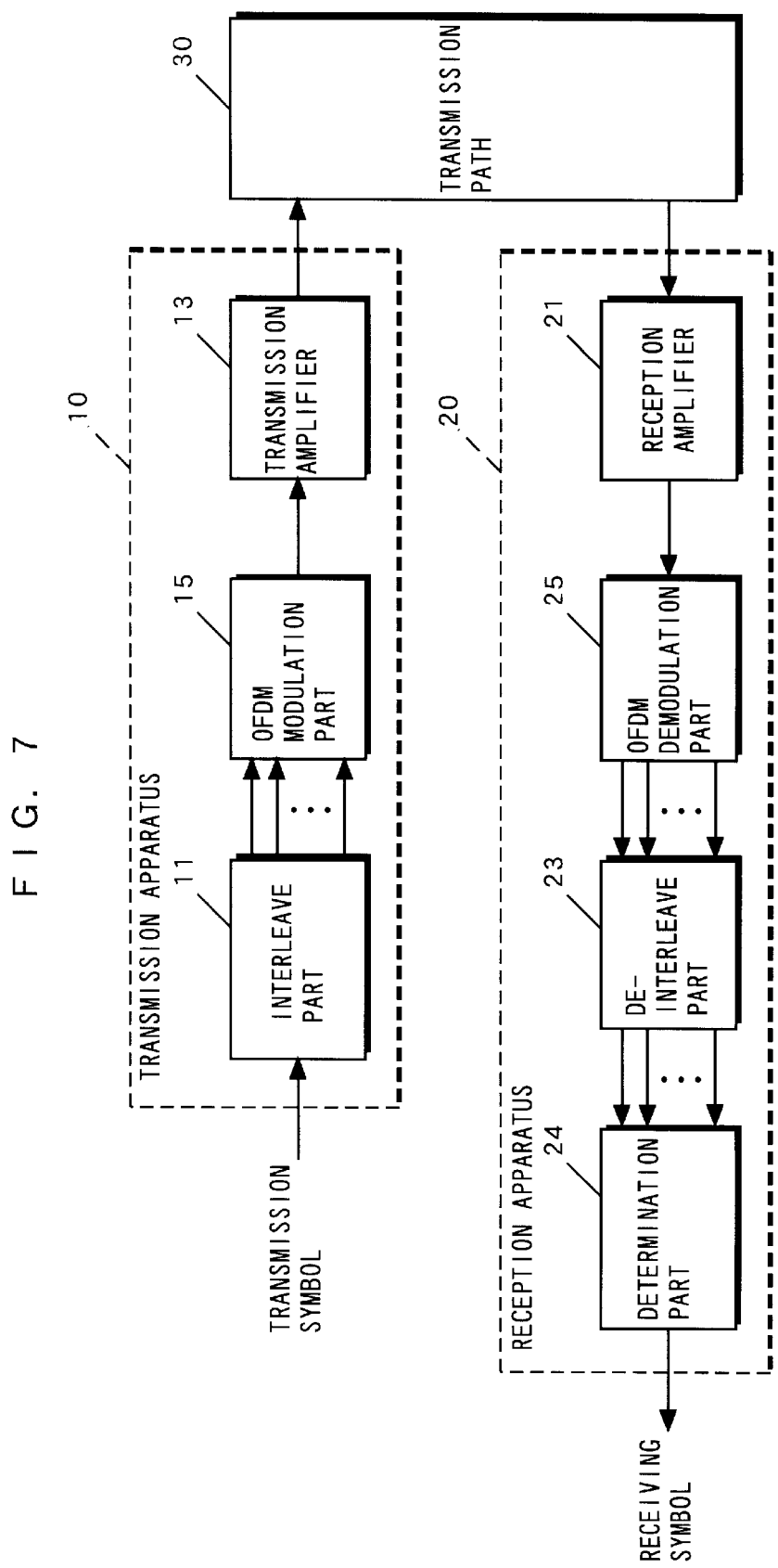

NOISE

TRIGGER SIGNAL

NOISE

TRIGGER SIGNAL

POWER-LINE CARRIER COMMUNICATIONS SYSTEM

BACKGROUND OF THE INVENTION

1. Field of the Invention

The present invention relates to power-line carrier communications systems, and more particularly to a system for digital communications using a power-line in which transmission-path characteristics and noise fluctuate in synchronization with power supply frequency.

2. Description of the Background Art

A power-line is not designed for data communications, but generally is only for transferring power. Further, impedance matching is not done for branched parts and terminations thereof. Consequently, using the power-line as a transmission path for data communications leads to harsh environments (frequency-gain characteristics or noise, for example).

Although the frequency-gain characteristics of the power-line show a tendency that a signal of lower frequency is attenuated comparatively less, attenuation characteristics differ according to transmission paths. Accordingly, signals at certain frequencies may not be transmitted due to resonance, and thus the characteristics cannot be uniquely specified.

Further, although a noise level in the power-line is comparatively high at lower frequencies, narrow-band noise, for example, may be involved, whereby the noise level also cannot be uniquely specified. Accordingly, such dependence on the transmission path renders a signal-to-noise ratio (S/N) at a reception point hard to specify at which frequency the ratio being the largest.

Likewise, when the power-line is distorted, no one can define where resonance will occur. Consequently, selecting a less-distorted frequency band for signal transmission is difficult.

Still further, the aforementioned characteristics are not static. In other words, devices connected to the power-line ceaselessly change in operation. Therefore, the devices' change in operation involves load characteristics' change, thereby dynamically changing the transmission-path characteristics and noise level, for example.

FIG. 8 exemplarily shows the gain-frequency characteristics of the power-line. As shown in FIG. 8, the gain characteristics of the power-line differ according to frequencies. FIG. 9 exemplarily shows the noise-frequency characteristics of a device. As shown in FIG. 9, a harmonic noise such as an inverter noise is concerned in the noise characteristics of device. Note that FIGS. 8 and 9 are only examples, and thus frequency and noise characteristics vary according to transmission paths or devices.

In such a general narrow-band communications system, it is difficult to appropriately cope with attenuation in the frequency bands or generation of noise shown in FIGS. 8 and 9. This is because no one can tell which signal at which frequency becomes non-transmissible due to attenuation caused by resonance or which signal at which frequency is affected by the harmonic noise.

Therefore, various techniques have been proposed so far to solve such problems by providing redundancy through a spread spectrum modulation scheme. Especially, a communications system in which a direct sequence scheme of spread spectrum is applied is noteworthy. Hereinafter, a conventional power-line carrier communications system in which the direct sequence spread spectrum system is described.

FIG. 10 is a block diagram exemplarily showing the conventional power-line carrier communications system in which the direct sequence spread spectrum system is applied. In FIG. 10, the conventional power-line carrier communications system is structured by a transmission apparatus 300 and a reception apparatus 400 interconnected through a transmission path 500. The transmission apparatus 300 includes a modulation part 301, a spread spectrum modulation part 302, a spread code part 303, and a transmission amplifier 304, while the reception apparatus 400 includes a reception amplifier 401, a spread spectrum demodulation part 402, a spread code part 403, and a demodulation part 404.

First, the transmission apparatus 300 is structurally described. A transmitting symbol is inputted into the modulation part 301. By using the received transmitting symbol, the modulation part 301 modulates a carrier in a predetermined arbitrary manner, and then outputs the modulated carrier. The spread code part 303 carries a spread code whose chip rate is higher than the symbol rate from the modulation part 301, and then outputs the spread code to the spread spectrum modulation part 302. The spread spectrum modulation part 302 multiplies the modulated carrier by the spread code so as to spread a spectrum on a frequency axis (widen a frequency band). The spread-spectrum-modulated transmitting signal is amplified in the transmitting amplifier 304 so as to be in a predetermined amplitude, and then is transmitted to the reception apparatus 400 side through the transmission path 500.

Next, the reception apparatus 400 is structurally described. A receiving signal coming through the transmission path 500 is amplified in the reception amplifier 401 so as to be in a predetermined amplitude, and then is outputted to the spread spectrum demodulation part 402. The spread code part 403 carries the same spread code as the spread code part 303 of the transmission apparatus 300 does, and outputs the spread code to the spread spectrum demodulation part 402. The spread spectrum demodulation part 402 subjects the receiving signal to inverse-spreading by multiplying the same by the spread code so that the widened frequency band is narrowed down to the original width. The inversely-spread receiving signal is demodulated in the demodulation part 404 (which corresponds to the modulation scheme applied in the modulation part 301 of the transmission apparatus 300), and then is outputted as a receiving symbol.

Although not being described in detail herein, such spread spectrum communications scheme has various features to synchronize the spread codes or to delay detection which enhances a distortion-resistance by referring to a preceding signal for inverse-spreading and simplifies a synchronization circuit.

As is known from the above, the conventional power-line carrier communications system spreads information on a frequency axis through spread spectrum. To be more specific, the conventional power-line carrier communications system provides a modulated signal with redundancy on a frequency axis and then transmits the resultant signal. Therefore, even if a signal is attenuated at a certain frequency or has a high noise level, the signal can be demodulated with help of other frequency components.

In such conventional power-line carrier communications system, however, the signal is redundant only on the frequency axis through spread spectrum. Accordingly, the system still has problems as described hereafter.

In the power-line, noise to be generated over time in devices connected thereto is more concerned than noise to be generated in the frequency bands. FIGS. 11A and 11B exemplarily show how the noise temporally changes. In both FIGS. 11A and 11B, an upper waveform is a noise waveform, and a lower is a trigger signal synchronizing with a power cycle. For the trigger signal, presumably, two clocks are equal to a power-supply cycle (herein, power-supply frequency is assumed to be 60 Hz).

As is obvious from FIGS. 11A and 11B, the noise level shows 120 Hz-periodicity in its fluctuation, which is twice as much as the power-supply cycle. Thus, noise in the power-line is typically synchronizing with the frequency being twice as much as the power-supply cycle.

In this manner, in the power-line carrier, S/N differs according to frequency bands on the frequency axis as shown in FIGS. 8 and 9. Further, as shown in FIGS. 11A and 11B, the noise level temporally varies on the time axis. Especially, impulse noise in FIG. 11B is wide in frequency and high in level, and whereby redundancy provided only on the frequency axis is not adequate to allow proper communication at the time when the high-level noise is observed.

Specifically, as is done in the conventional power-line carrier communications system, redundancy provided only on the frequency axis is not sufficient to cope with noise on the time axis, and accordingly errors occur during communications.

SUMMARY OF THE INVENTION

Therefore, an object of the present invention is to provide a reliable power-line carrier communications system having a resistance to strong (high-level) impulse noise synchronized with power-cycle frequency in virtue of redundancy on both time and frequency axes.

The present invention has the following features to attain the objects above.

A first aspect of the present invention is directed to a power-line carrier communications system in which a power-line is used for a transmission path, and a symbol is transmitted from a transmitting apparatus to a reception apparatus, wherein the transmission apparatus comprises:

an interleave part for shuffling m symbols (where m is an integer of 2 or more) in a unit of symbol stream in n ways (where n is an integer of 2 or more) and generating n-type symbol streams in which 1st to mth symbols are shuffled;

a modulation part for subjecting the n-type symbol streams generated by the interleave part to amplitude-modulation and/or phase-modulation in such a manner as to randomly distribute each symbol on both time and frequency axes by using predetermined carriers each corresponding thereto, and outputting the same as modulated signals; and a transmission amplifier part for amplifying the modulation signals to be in a predetermined amplitude, and outputting the same to the transmission path, and the reception apparatus comprises:

a reception amplifier part for amplifying, to be in a predetermined amplitude, and outputting the modulating signals received through the transmission path;

a demodulation part for subjecting the modulating signals outputted from the reception amplifier part to amplitude-modulation and/or phase-demodulation by using predetermined reference carriers each corresponding thereto, and then generating n-type amplitude/phase information streams;

a de-interleave part for unshuffling the symbols in the n-type amplitude/phase information streams generated by the demodulation part in an inverse manner to the interleave part, and then outputting the unshuffled n-type amplitude/phase information streams; and a determination part for determining a value respectively for the 1st to mth symbols according to each information on the unshuffled n-type amplitude/phase information streams outputted from the de-interleave part.

As described above, in the first aspect, symbols are transmitted from the transmission apparatus side in such a manner as to be redundant on both frequency and time axes on the transmission path, while original values of the symbols are determined on the reception apparatus side according to signals transmitted in various timing and frequencies. In this manner, in virtue of redundancy on the time axis, communications can take place with robustness even if noise at an intensively high level occurs at an arbitrary time. Furthermore, the modulation part carries out such modulation that information on the same symbol is randomly distributed on both frequency and time axes. As the correlation between the information on the same symbol on both time and frequency axes gets low after shuffling, communications can take place with improved robustness no matter how noise and transmission-path characteristics show high correlation between time and frequency.

According to a second aspect, in the first aspect, the determination part calculates an average value of amplitude information and/or phase information within a predetermined threshold value from kth (where k is an integer equal to or less than m) amplitude information and/or phase information in the unshuffled n-type amplitude/phase information streams, and then determining a value of a kth symbol according to the average value.

As described above, in the second aspect, the determination part determines a symbol value from an average value of information of the same symbol position within a predetermined threshold value. Therefore, symbols can be determined in a highly reliable manner.

According to a third aspect, in the first aspect, from kth (where k is an integer equal to or less than m) amplitude information and/or phase information in the unshuffled n-type amplitude/phase information streams, the determination part calculates an amplitude average value of the amplitude/phase information streams transmitted with the same carrier, calculates relative amplitude information for the amplitude average value, determines a degree of reliability based on whether or not a value of the relative amplitude information is within a predetermined range, and calculates an average value by using only reliable amplitude information and/or phase information, and then determines a value of a kth symbol according to the average value.

According to a fourth aspect, in the first aspect, from kth (where k is an integer equal to or less than m) amplitude information and/or phase information in the unshuffled n-type amplitude/phase information streams, the determination part calculates amplitude average and distribution values of the amplitude/phase information streams transmitted with the same carrier, calculates relative amplitude information for the amplitude average value, determines a degree of reliability based on whether or not an absolute value of the relative amplitude information is smaller than an absolute value obtained by multiplying the distribution value by a predetermined constant, and calculates an average value by using only reliable amplitude information and/or phase information, and then determines a value of a kth symbol according to the average value.

According to a fifth aspect, in the first aspect, from kth (where k is an integer equal to or less than m) amplitude information and/or phase information in the unshuffled n-type amplitude/phase information streams, the determination part determines a degree of reliability based on whether or not a difference between an amplitude value of symbol of the amplitude/phase information streams transmitted and an amplitude value of a preceding symbol, with the same carrier, is within a predetermined value, and calculates an average value by using only reliable amplitude information and/or phase information, and then determines a value of a kth symbol according to the average value.

As described above, in the third to fifth aspects, reliability of information in the amplitude/phase information streams is determined for a determination algorithm in the determination part, and only information determined as being reliable is used to calculate the phase and amplitude average values. In this manner, symbol determination can be carried out in a more reliable manner compared with the second aspect.

According to sixth to tenth aspects, in the first to fifth aspects, the symbol stream having 1st to mth symbols in the interleave part is equal to or less than a half power-supply cycle time.

As described above, in the sixth to tenth aspects, the unit length of a symbol stream is equalized with a cycle time, which is twice as much as a power supply (1/integer). In this manner, symbol determination can be effectively carried out with much higher reliability.

According to eleventh to twentieth aspects, in the first to tenth aspects, the modulation part modulates in an OFDM scheme, and the demodulation part demodulates in the OFDM scheme.

As described above, in the eleventh to twentieth aspects, modulation/demodulation is carried out in the OFDM scheme. In this manner, in addition to the effects in the first to tenth aspects, characteristics can be effectively and usefully improved in virtue of better efficiency of frequency utilization, which is obtained through the OFDM scheme in which orthogonality of frequency is advantageously taken.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2 and 3 are diagrams each exemplarily showing a correlation between carrier frequency and symbol stream;

FIGS. 6A and 6B are detailed diagrams each exemplarily showing how a symbol differentiation part 14 in FIG. 5 is operated;

FIGS. 6C and 6D are detailed diagrams each exemplarily showing how a demodulation part 22 in FIG. 5 is operated;

FIG. 7 is a block diagram showing the structure of a power-line carrier communications system according to a fourth embodiment of the present invention;

DESCRIPTION OF THE PREFERRED EMBODIMENTS (First Embodiment)

Figure 1:
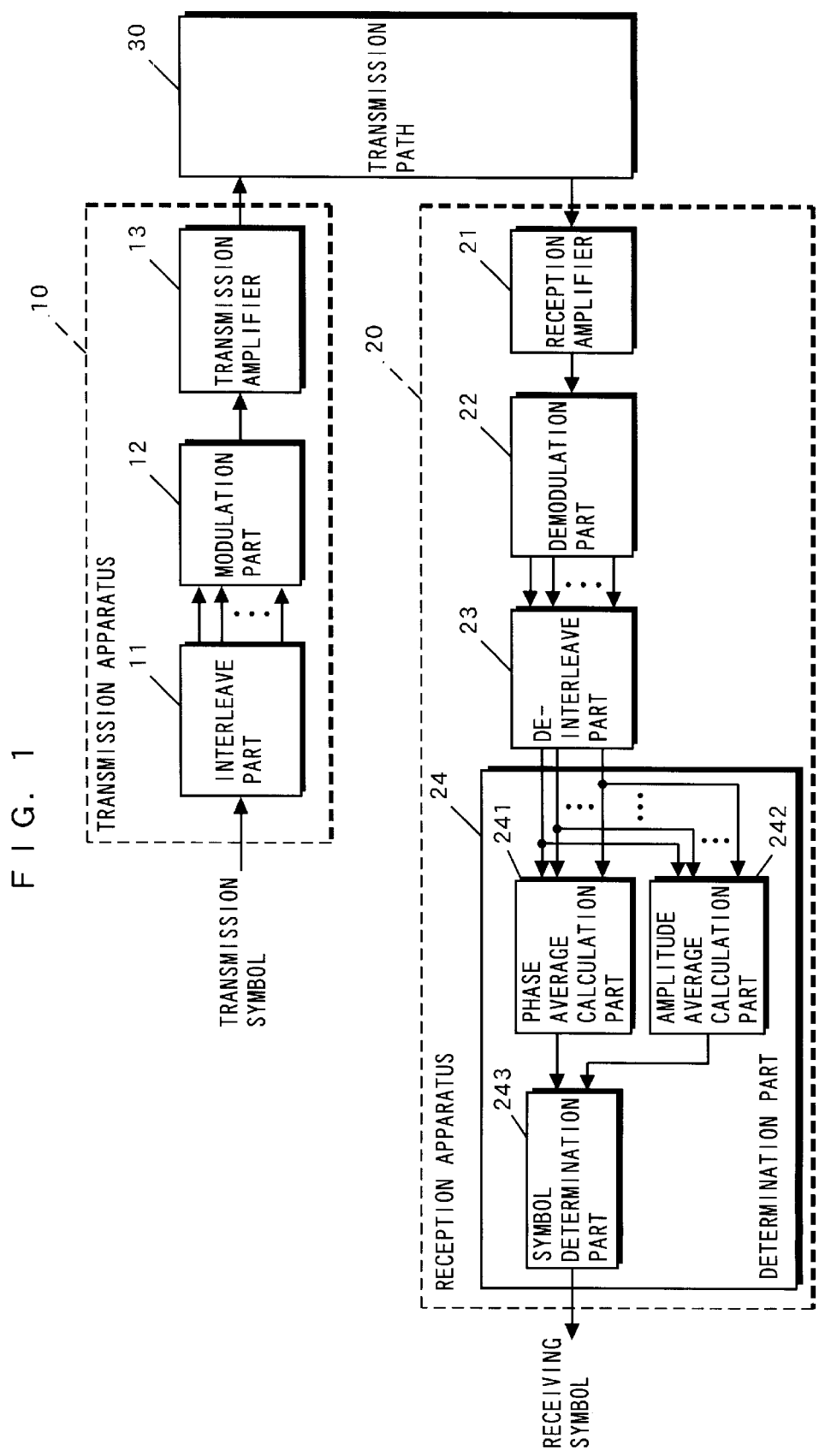
FIG. 1 is a block diagram showing the structure of a power-line carrier communications system according to a first embodiment of the present invention.

FIG. 1 is a block diagram showing the structure of a power-line carrier communications system according to a first embodiment of the present invention. In FIG. 1, the power-line carrier communications system of the first embodiment is structured by a transmission apparatus 10 and a reception apparatus 20 interconnected through a transmission path 30. The transmission apparatus 10 includes an interleave part 11, a modulation part 12, and a transmission amplifier 13, while the reception apparatus 20 includes a reception amplifier 21, a demodulation part 22, a de-interleave part 23, and a determination part 24.

In the transmission apparatus 10, transmitting symbols are inputted into the interleave part 11. The interleave part 11 generates a plurality of symbol streams each structured by the transmitting symbols shuffled on a time axis in a later-described predetermined shuffling technique. The modulation part 12 then modulates carriers varied in frequency for every symbol stream by applying a predetermined modulation scheme. The transmission amplifier 13 receives modulating signals outputted from the modulation part 12. The signals are then amplified therein in such a manner as to be in a predetermined amplitude, and then are transmitted to the reception apparatus 20 side through the transmission path 30.

In the reception apparatus 20, receiving signals coming through the transmission path 30 are inputted into the reception amplifier 21. The reception amplifier 21 amplifies the signals in such a manner as to set the signals in a predetermined amplitude, and then outputs the same to the demodulation part 22. The demodulation part 22 extracts amplitude/phase information included in each carrier by applying a predetermined demodulation scheme (which corresponds to the modulation scheme applied in the modulation part 12 of the transmission apparatus 10), and then outputs the information to the de-interleave part 23 plurally in stream form. The de-interleave part 23 again shuffles, in a predetermined manner, symbols in amplitude/phase information streams received from the demodulation part 22 in an inverse manner to the interleave part 11 of the transmission apparatus 10 to rearrange the order thereof (hereinafter, unshuffles), and then outputs the streams to the determination part 24. The determination part 24 determines a symbol value according to amplitude/phase information values in the same timing for every amplitude/phase information stream, and then outputs the values in a receiving symbol stream.

Hereinafter, with exemplary figures, it is described how such power-line carrier communications system of the first embodiment is operated. In this example, presumably, power-supply cycle is 60 Hz, transmitting symbols are binary data, and a transmission rate is 28.8 kbps.

Under such conditions, the interleave part 11 regards a transmitting symbol stream having 80 symbols as a unit (a group), and interleaves the unit by 5 symbols. In detail, the interleave part 11 generates 16 types of streams from one symbol stream having 80 symbols by shuffling the stream in 16 ways (=80 symbols/5 symbols). The reason for 80 symbols in length is that 80-symbol corresponds to a cycle of 120 Hz with respect to the transmission rate of 28.8 kbps, and the cycle is twice as much as the power-supply cycle of 60 Hz. Note that the number of symbols for shuffling (herein, 5 symbols) is arbitrarily determined depending on the state of the transmission path 30, for example.

Specifically, the interleave part 11 shuffles the 1st to 80th symbols by 5 symbols, and generates 16 types of symbol streams (1st to 16th) as described below.

1st symbol stream: 1st to 80th symbols
2nd symbol stream: 6th to 80th symbols, 1st to 5th symbols
kth symbol stream: (5*(k−1)+1)th to 80th symbols, 1st to (5*(k−1))th symbols
(where variable k takes on integers from 3 to 15)
16th symbol stream: 76th to 80th symbols, 1st to 75th symbols Thereafter, the interleave part 11 outputs these 1st to 16th symbol streams to the modulation part 12.

By applying the predetermined modulation scheme such as an 8 QAM (8 Quadrature Amplitude Modulation) scheme, the modulation part 12 amplitude/phase-modulates carriers varied in frequency for every symbol stream.

Supposedly, the modulation part 12 applies 8QAM to a carrier at frequency of 115.2 kHz in the 1st symbol stream, a carrier at 134.4 kHz in the 2nd, a carrier at (19.2*(k+5)) kHz in the kth, and a carrier at 403.2 kHz in the 16th. Thereafter, the modulation part 12 outputs these modulated signals to the transmission amplifier 13.

FIG. 2 shows a correlation between the 16 carriers and 16 types of shuffled symbol streams for modulating the carriers. It is known from FIG. 2 that the transmitting symbols are evenly redundant in both directions of frequency and time axes. As shown in FIG. 3, the carriers and symbol streams may have another correlation, where information on the same symbol is randomly distributed on both frequency and time axes in comparison with FIG. 2. As the correlation between the information on the same symbol on both time and frequency axes therein is low after shuffling, communications can take place with improved robustness no matter how noise and transmission-path characteristics show high correlation between time and frequency. FIG. 2. As the correlation between the information on the same symbol on both time and frequency axes therein is low after shuffling, communications can be taken place with improved robustness no matter how noise and transmission-path characteristics show high correlation between time and frequency.

Note that the technique of shuffling symbols is not limited to the ones shown in FIGS. 2 and 3, and any will be similarly effective as long as the symbols are redundant on both time and frequency axes. It will be highly effective if information on the same symbol does not appear in close proximity on time and frequency axes.

The transmission amplifier 13 receives the modulated signals outputted from the modulation part 12, amplifies the signals in such a manner as to set the signals in a predetermined amplitude, and then transmits the signals to the reception apparatus 20 side through the transmission path 30.

Next, the reception apparatus 20 is described. The receiving signals coming through the transmission path 30 are inputted into the reception amplifier 21. The reception amplifier 21 amplifies the signals in such a manner as to set the signals in a predetermined amplitude, and then outputs the signals to the demodulation part 22. From the received signals, the demodulation part 22 extracts amplitude/phase information included in each carrier by applying the predetermined demodulation scheme corresponding to the modulation scheme applied in the modulation part 12 of the transmission apparatus 10, that is, 8 QAM scheme herein, and then outputs the information to the de-interleave part 23 in 16 streams. The de-interleave part 23 unshuffles symbols in the 16 amplitude/phase information streams received from the demodulation part 22, and then outputs the streams to the determination part 24. The determination part 24 determines a symbol value of each of the amplitude/phase information streams, and then outputs the values as receiving symbols.

Referring back to FIG. 1, it is described how. the determination part 24 is operated. In FIG. 1, the determination part 24 includes a phase average calculation part 241, an amplitude average calculation part 242, and a symbol determination part 243. As described in the foregoing, the 16 amplitude/phase information streams outputted from the de-interleave part 23 are equal in symbol arrangement (in ascending order; 1st to 80th). Some of the symbols may show some changes in amplitude/phase thereof caused by characteristics of the transmission path 30 and noise of devices, for example. Therefore, the determination part 24 determines a symbol value in the following manner for such changes.

The phase average calculation part 241 takes out phase information on the same symbol respectively from the unshuffled symbols in the 16 amplitude/phase information streams. To be more specific, the 1st symbol may have 16 types of phase information taken out respectively from the amplitude/phase information streams. Thereafter, the phase average calculation part 241 calculates an average value thereof (hereinafter, referred to as phase average value) for the 1st to 80th symbols.

On the other hand, the amplitude average calculation part 242 takes out amplitude information on the same symbol respectively from the unshuffled 16 amplitude/phase information streams. To be more specific, the 1st symbol may have 16 types of amplitude information taken out respectively from the amplitude/phase information streams. Thereafter, the amplitude average calculation part 242 calculates an average value thereof (hereinafter, referred to as amplitude average value) for the 1st to 80th symbols.

Thereafter, the phase and amplitude average values of the 1st to 80th symbols are each outputted to the symbol determination part 243.

The symbol determination part 243 determines for every symbol which reference phase value is close to the phase average value provided by the phase average calculation part 241. In detail, as modulation/demodulation is done through 8QAM in this example, the symbol determination part 243 determines for every symbol to which reference phase value of 0, π/2, π, or 3 π/4 the phase average value is the closest. Likewise, the symbol determination part 243 determines for every symbol which reference amplitude value is close to the amplitude average value provided by the amplitude average calculation part 242. Specifically, as modulation/demodulation is done through 8QAM in this example, the symbol determination part 243 determines for every symbol to which reference amplitude value of a or 3a (where a is a positive real number predetermined in the demodulation part 22) the amplitude average value is closer. Thereafter, the symbol determination part 243 determines a final value for every symbol from the phase value and amplitude value, and then outputs the values in a receiving symbol stream.

As is known from the above, in the power-line carrier communications system according to the first embodiment of the present invention, symbols are transmitted on the transmission apparatus 10 side in such a manner as to be redundant on both frequency and time axes on the transmission path 30, while original values of the symbols are determined on the reception apparatus 20 side according to signals transmitted in various timing and frequencies. In this manner, in virtue of redundancy on the time axis, communications can be taken place with robustness even if noise at an intensively high level occurs at an arbitrary time.

Herein, 8QAM is applied in the modulation part 12 and the demodulation part 22 for modulation/demodulation, but any other scheme is similarly effective. Further, the determination part 24 uses both amplitude information and phase information to determine the symbol values, but either one may be sufficient. Still further, the power-supply cycle, the transmission rate, and the number of symbols and carriers per group herein are described in specific figures, but are not limited thereto. Such figures may be changed with the communications environment and purposes. As described in the foregoing, the number of symbols per group may be equalized with the frequency cycle which is twice as much as the power-supply cycle for better effects.

(Second Embodiment)

Figure 4:
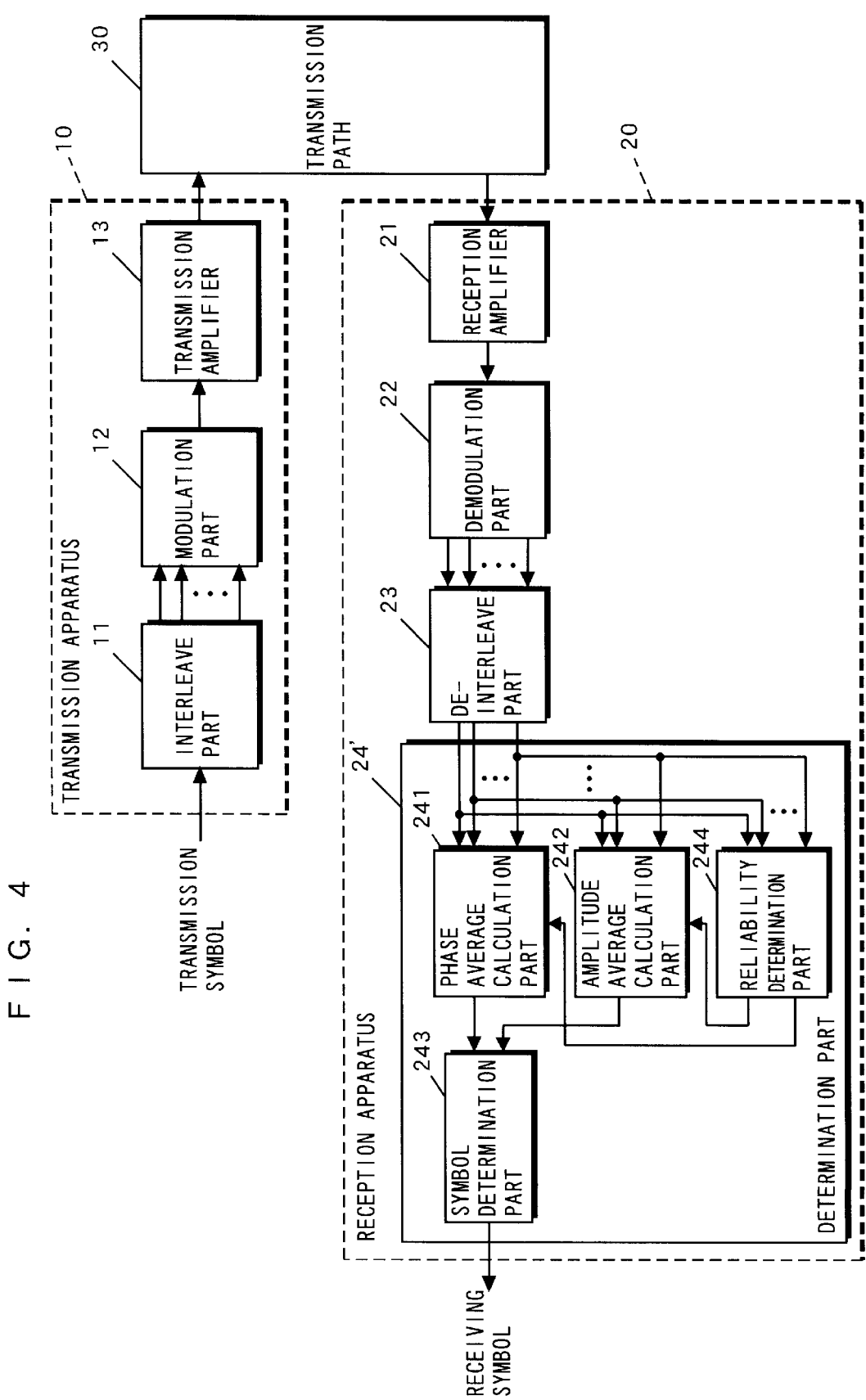
FIG. 4 is a block diagram showing the structure of a power-line carrier communications system according to a second embodiment of the present invention.

FIG. 4 is a block diagram showing the structure of a power-line carrier communications system according to a second embodiment of the present invention. In FIG. 4, the power-line carrier communications system of the second embodiment is structured by the transmission apparatus 10 and the reception apparatus 20 interconnected through the transmission path 30. The transmission apparatus 10 includes the interleave part 11, the modulation part 12, and the transmission amplifier 13, while the reception apparatus 20 includes the reception amplifier 21, the demodulation part 22, the de-interleave part 23, and a determination part 24'.

As shown in FIG. 4, except for the determination part 24' replaced by the determination part 24, the power-line carrier communications system of the second embodiment is identical to the power-line carrier communications system of the first embodiment. Therefore, aside from the determination part, the components therein are provided with the same reference numerals, and are not described again.

Referring to FIG. 4, the determination part 24' includes a phase average calculation part 241, an amplitude average calculation part 242, a symbol determination part 243, and a reliability determination part 244. The reliability determination part 244 receives 16 amplitude/phase information streams having unshuffled symbols in a similar manner to the phase average calculation part 241 and amplitude average calculation part 242. Thereafter, the reliability determination part 244 determines for every amplitude/phase information stream whether or not information thereon is reliable enough to use for the phase and amplitude average values. Then, the reliability determination part 244 instructs the phase average calculation part 241 and the amplitude average value calculation part 242 to use only the information determined as being reliable enough for the phase and amplitude values.

There are several techniques of determining reliability in the reliability determination part 244, and one of them is exemplarily described next below.

(1) Reliability Determination of Amplitude Information.

A signal in small amplitude refers to its low level, thereby implying lower reliability of phase information corresponding thereto. Likewise, a signal in large amplitude hints at a high surge noise's detection at power-on, leading to lower reliability. Accordingly, reliability can be determined by referring to whether or not an amplitude value is within a predetermined range.

Such range may be predefined by several techniques as discussed below.

Define the range by using absolute values.

Define the range by using relative values calculated from a statistical average value in a predetermined time period.

Herein, the technique using the relative values is more complicated in calculation but is more trustworthy. The technique is carried out, for example, by first calculating an amplitude average value of amplitude/phase information streams transmitted with the same carrier, second calculating relative amplitude information therefor, and last referring to the value of the relative amplitude information whether or not in a predetermined range. In another manner, average and distribution values of amplitude/phase information streams transmitted with the same carrier are first calculated, secondly relative amplitude information therefor is calculated, and lastly referring to the value of the relative amplitude information whether or not an amplitude value thereof is smaller than an absolute value of a value obtained by multiplying the distribution value by a predetermined constant. In a simpler manner using the relative values, reliability may be determined as being low when an amplitude difference between a symbol and a preceding symbol is considerably large.

(2) Reliability Determination of Phase Information.

When S/N is large, phase information indicates a phase value denoting a specific symbol. The phase value may deviate due to noise, for example, thereby rendering reliability thereof low. Accordingly, reliability of the phase information can also be determined by referring to whether or not a phase value is within a predetermined range.

Herein, phase modulation in binary, 0 and π, is taken as an example. In this case, each phase value is supposed to be close to 0 or π. Accordingly, any phase value being close to π/2 indicates that the information is quite low in its reliability. In this manner, reliability is determined by referring to S/N based on whether or not the phase value is within a range predetermined by large S/N.

After the reliability determination part 244 determines reliability, the phase average calculation part 241 calculates a phase average value from plural (equal to or less than 16) phase information for the 1st to 80th symbols by following the instruction of the reliability determination part 244. In a similar manner, the amplitude average calculation part 242 calculates an amplitude average value from plural (equal to or less than 16) amplitude information for the 1st to 80th symbols by following the instruction of the reliability determination part 244.

As is understood from the above, in the power-line carrier communications system according to the second embodiment of the present invention, reliability of information in the amplitude/phase information streams is determined for a determination algorithm in the determination part 24 and only information determined as being reliable is used for the phase and amplitude average values. In this manner, symbol determination can be carried out in a more reliable manner compared with the first embodiment.

Herein, when either amplitude information or phase information is used to determine symbol values in the determination part 24', so is in the reliability determination part 244.

(Third Embodiment)

Figure 5:
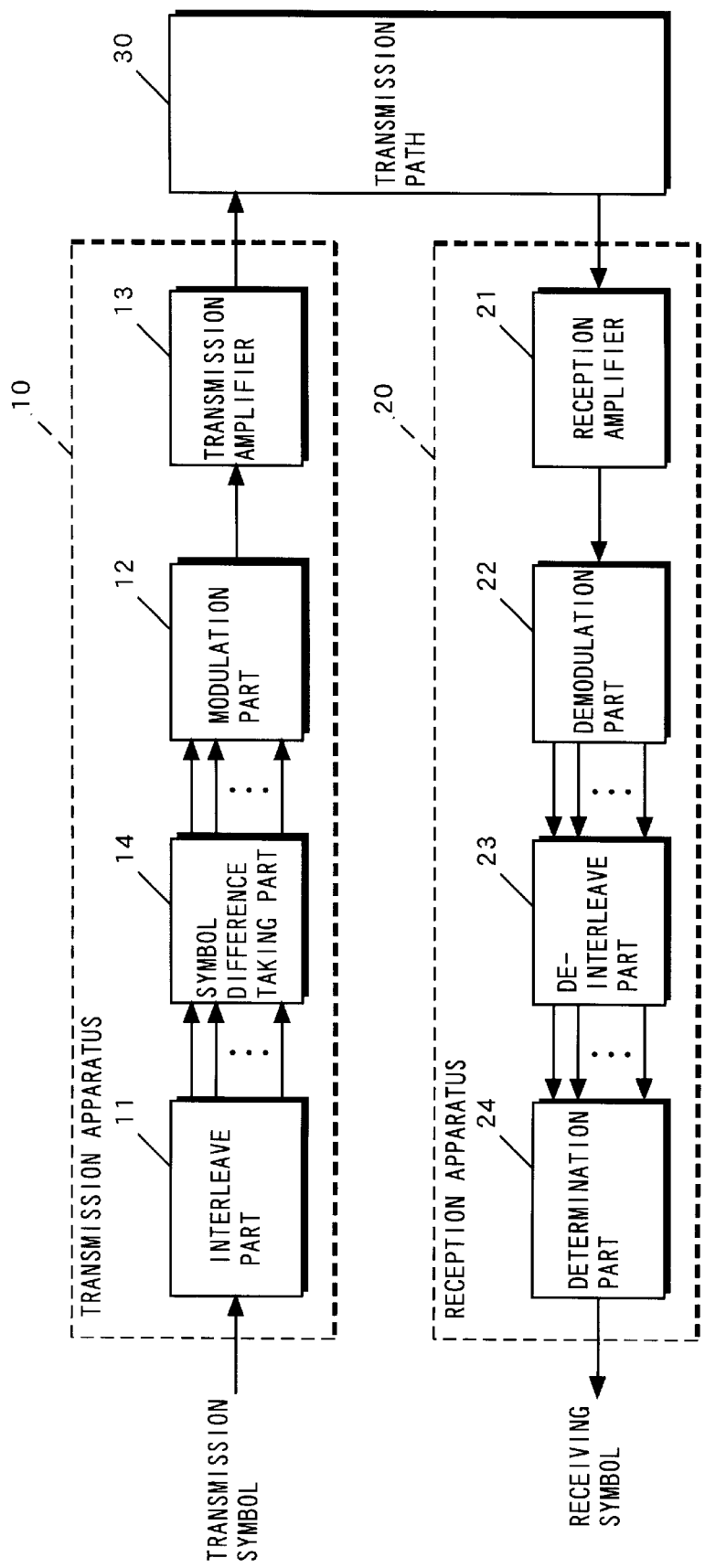
FIG. 5 is a block diagram showing the structure of a power-line carrier communications system according to a third embodiment of the present invention.
Figure 8:
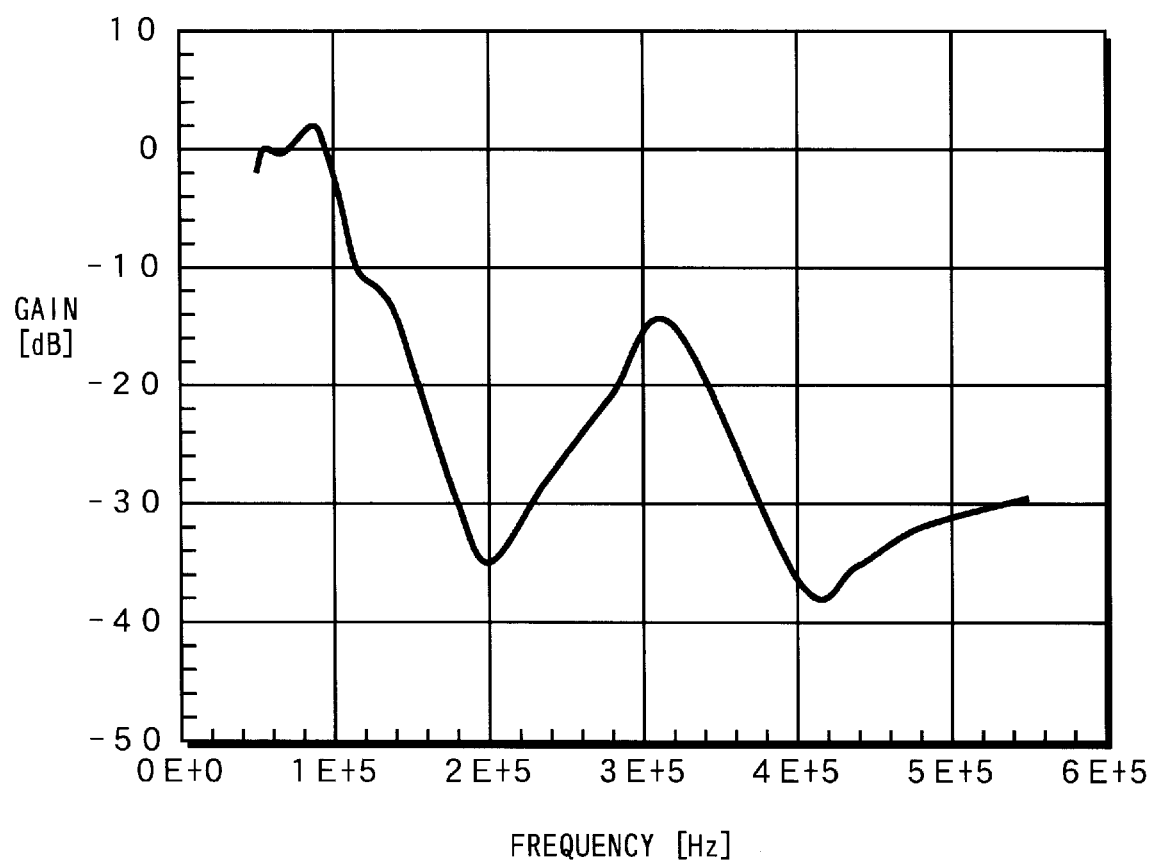
FIG. 8 is a diagram exemplarily showing gain-frequency characteristics of a power-line.
Figure 9:
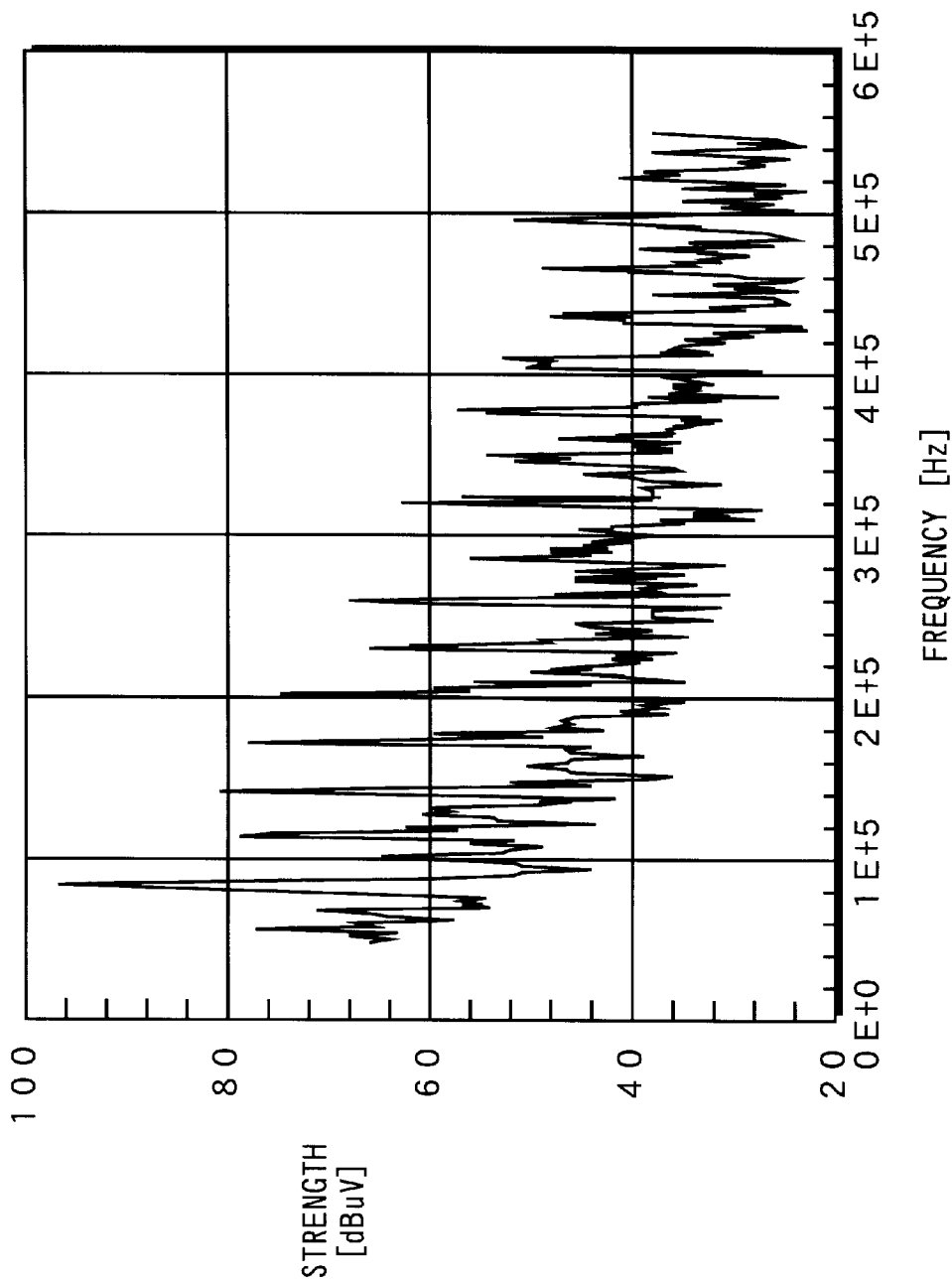
FIG. 9 is a diagram exemplarily showing noise-frequency characteristics of a device.
Figure 10:
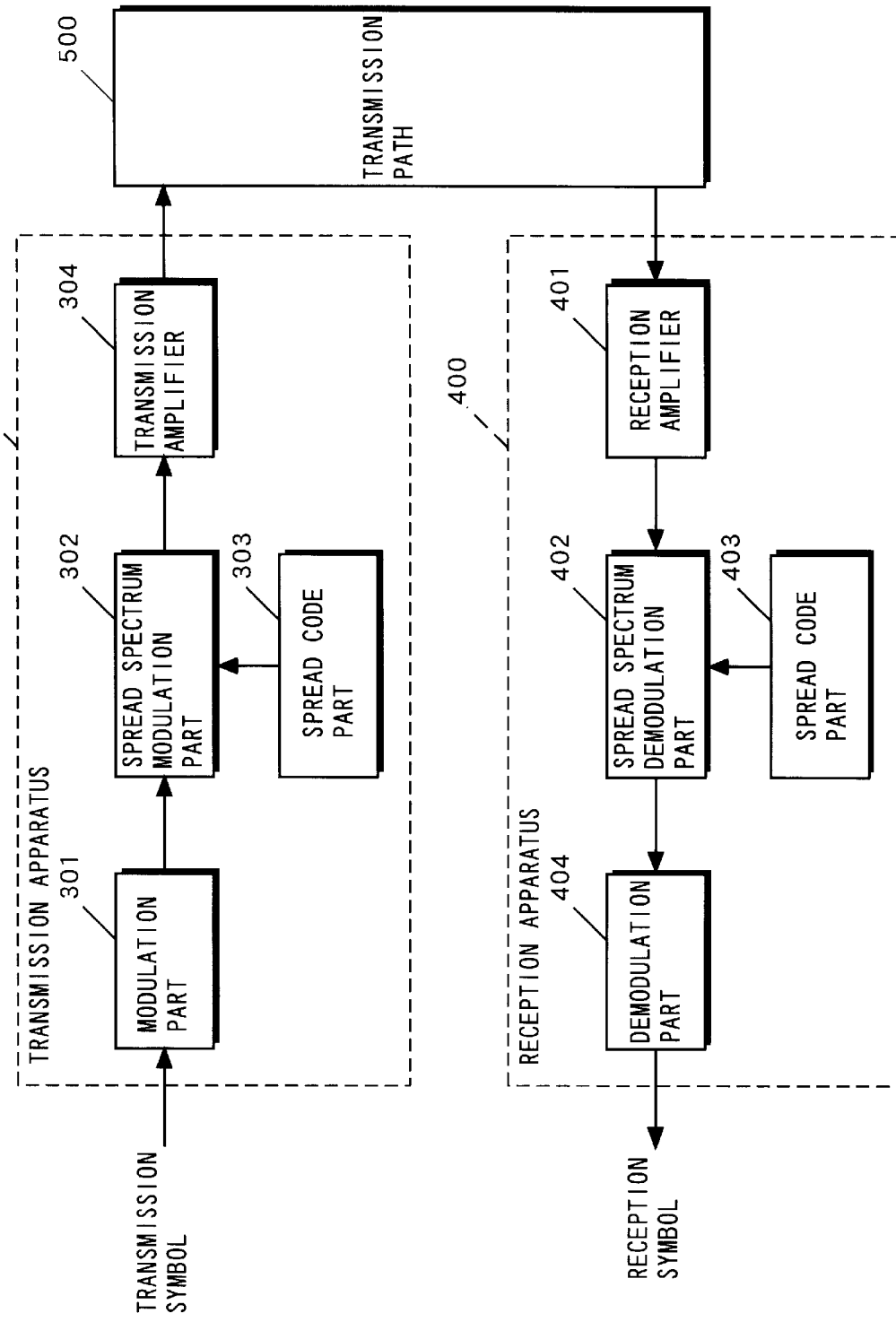
FIG. 10 is a block diagram exemplarily showing the structure of a conventional power-line carrier communications system in which a direct sequence scheme of spread spectrum is applied.
Figure 11A:
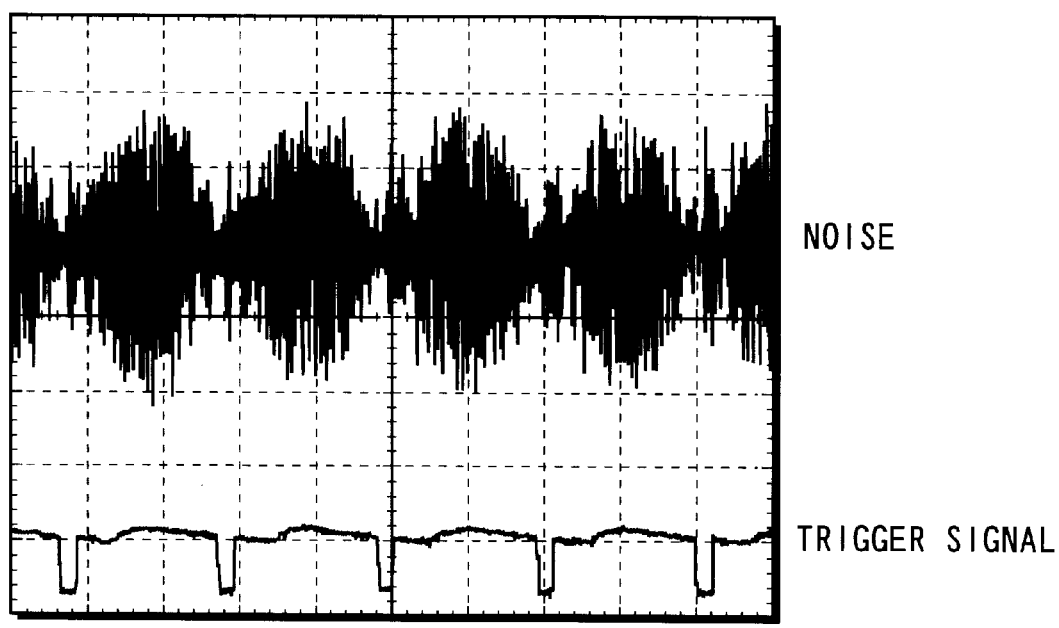
FIGS. 11A and 11B are diagrams each exemplarily showing temporal fluctuation of noise generated in the device.
Figure 11B:
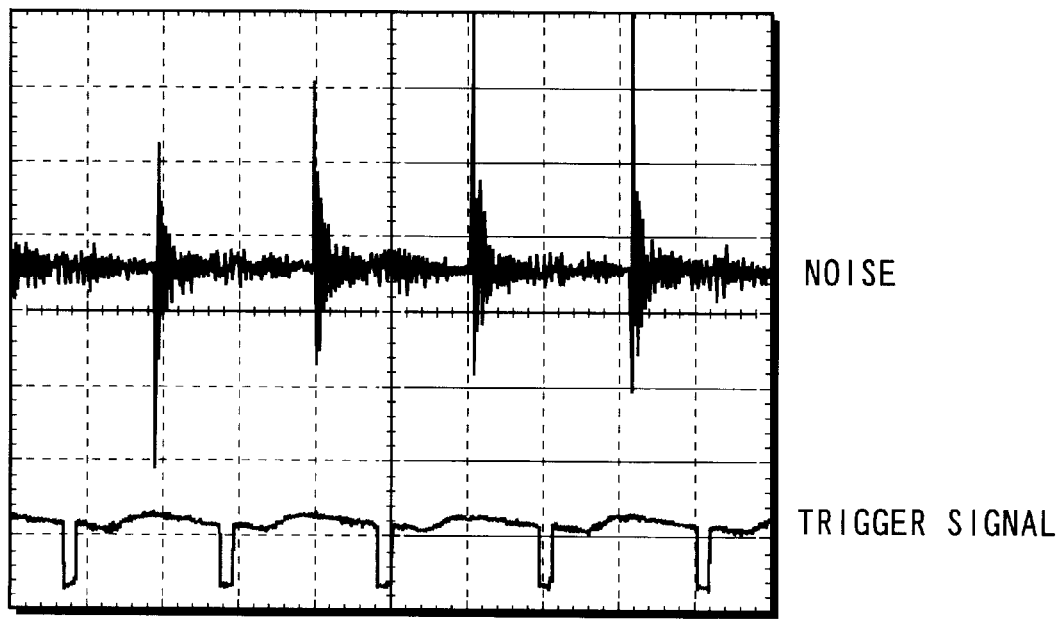

FIG. 5 is a block diagram showing a power-line carrier communications system according to a third embodiment of the present invention. In FIG. 5, the power-line carrier communications system of the third embodiment is structured by the transmission apparatus 10 and the reception apparatus 20 interconnected through the transmission path 30. The transmission apparatus 10 includes the interleave part 11, a symbol differentiation part 14, the modulation part 12, and the transmission amplifier 13, while the reception apparatus 20 includes the reception amplifier 21, the demodulation part 22, the de-interleave part 23, and the determination part 24.

As shown in FIG. 5, the power-line carrier communications system of the third embodiment is similar to the power-line carrier communications system of the first embodiment but is additionally provided with the symbol differentiation part 14 between the interleave part 11 and the modulation part 12 in the transmission apparatus 10. Aside from the symbol differentiation part 14, the components therein are provided with the same reference numerals, and are not described again.

In the transmission apparatus 10, the interleave part 11 generates a plurality of symbol streams each structured by the transmitting symbols shuffled on a time axis. Thereafter, the interleave part 11 outputs these streams to the symbol differentiation part 14. The symbol differentiation part 14 converts each symbol information of the symbol streams in such a manner as to have the information correspond to a phase difference between the symbol and a preceding symbol (relative phase), and then outputs the information to the modulation part 12. As a specific example, the symbol differentiation part 14 is structured by a circuit shown in FIG. 6A. An XOR circuit 141 receives a symbol outputted from the interleave part 11 and a symbol one-symbol-delayed (that is, outputted in relation to the preceding symbol) via a delay part 142. In this manner, as exemplarily shown in FIG. 6B, the symbol differentiation part 14 outputs a symbol of "... 011000..." with respect to the received symbol of "... 110100..." (in FIG. 6B, an immediately-before output of the symbol is provided with a symbol "1").

In the reception apparatus 20, when demodulating receiving signals in a corresponding manner to modulation applied in the modulation part 12 to take out amplitude/phase information in carriers, the demodulation part 22 simultaneously outputs a amplitude/phase information stream indicating how each carrier has changed with respect to a preceding symbol. In other words, the demodulation part 22 detects any delay in receiving signals. As a specific example, the demodulation part 22 is structured by a circuit shown in FIG. 6C. An XOR circuit 221 receives a demodulated symbol and a symbol which is the demodulated symbol one-symbol-delayed via a delay part 222. In this manner, the demodulation part 22 outputs, as shown in FIG. 6D, a symbol of "... 110100..." being a phase difference from the received symbol of "... 1011000...".

As is known from the above, in the power-line carrier communications system according to the third embodiment of the present invention, information as an amplitude/phase difference between a current symbol and a preceding symbol is outputted in the transmission apparatus 10, while demodulation is carried out in a delayed detection scheme in the reception apparatus 20. In this manner, distortion-resistant communications can take place, and symbol determination can be carried out in more reliable manner compared with the first embodiment.

Herein, although the determination part 24 described in the first embodiment is employed in the reception apparatus 20, the determination part 24 in the second embodiment is surely sufficient. With the determination part 24 symbols can be determined in a much more reliable manner than the second embodiment.

(Fourth Embodiment)

The present invention is characterized in that symbols in a symbol stream in a predetermined length is shuffled in n ways (where n is a positive integer), and then n-type symbol streams are each assigned to frequencies and transmitted. Therefore, even when the symbol streams are subjected to OFDM (Orthogonal Frequency Division Multiplexing) modulation so as to be mapped on the frequency axis and OFDM demodulation for taking out information mapped thereon, it is effective similarly to the first and second embodiments in the foregoing.

FIG. 7 is a block diagram showing the structure of a power-line carrier communications system according to a fourth embodiment of the present invention. In FIG. 7, the power-line carrier communications system of the fourth embodiment is structured by the transmission apparatus 10 and the reception apparatus 20 interconnected through the transmission path 30. The transmission apparatus 10 includes the interleave part 11, an OFDM modulation part 15, and the transmission amplifier 13, while the reception apparatus 20 includes the reception amplifier 21, an OFDM demodulation part 25, the de-interleave part 23, and the determination part 24.

As shown in FIG. 7, except for the OFDM modulation part 15 replaced by the modulation part 12 and the OFDM demodulation part 25 replaced by the demodulation part 22, the power-line carrier communications system of the fourth embodiment is similar to the power-line carrier communications system of the first embodiment. Therefore, aside from the OFDM modulation part 15 and the OFDM demodulation part 25, the components therein are provided with the same reference numerals, and are not described again.

In the transmission apparatus 10, the OFDM modulation part 15 subjects a symbol in n-type symbol stream parallel data received from the interleave part 11 to an inverse FFT (Fast Fourier Transform) operation so as to convert amplitude/phase information on the frequency axis into time-axis data. Next, the OFDM modulation part 15 parallel/serial converts the n-type symbol stream parallel data after the time-axis data conversion, and then generates time-series signals of the symbols. Thereafter, the OFDM modulation part 15 subjects the time-series signals to D/A conversion, and then outputs the signals to the transmission amplifier 13.

On the other hand, in the reception apparatus 20, the OFDM demodulation part 25 subjects receiving signals inputted from the reception amplifier 21 to A/D conversion, and then serial/parallel converts a symbol so as to extract n-type symbol stream parallel data of the time-axis data. Thereafter, the OFDM demodulation part 25 subjects the n-type symbol stream parallel data to an FFT operation for frequency analysis to find amplitude/phase information on the frequency axis. Then the n-type symbol stream parallel data is outputted to the deinterleave part 23.

As is understood from the above, in the power-line carrier communications system according to the fourth embodiment of the present invention, the OFDM scheme is applied for modulation/demodulation. Accordingly, in addition to the effects described in the first and second embodiments, transmission characteristics are less susceptible to deterioration due to the OFDM scheme. Furthermore, even when noise is observed in a specific frequency band, characteristics thereof can be effectively improved by interleaving, for example.

Herein, although the determination part 24 described in the first embodiment is employed in the reception apparatus 20, the determination part 24 in the second embodiment is surely sufficient. With the determination part 24 symbols can be determined in a much more reliable manner than the second embodiment.

While the invention has been described in detail, the foregoing description is in all aspects illustrative and not restrictive. It is understood that numerous other modifications and variations can be devised without departing from the scope of the invention.

What is claimed is:

1. A power-line carrier communications system in which a power-line is used for a transmission path, and a symbol is transmitted from a transmitting apparatus to a reception apparatus, wherein said transmission apparatus comprises:
  interleave means for shuffling m symbols (where m is an integer of 2 or more) in a unit of symbol stream in n ways (where n is an integer of 2 or more) and generating n-type symbol streams in which 1st to mth symbols are shuffled;
  modulation means for subjecting said n-type symbol streams generated by said interleave means to amplitude-modulation and/or phase-modulation in such a manner as to randomly distribute each symbol on both time and frequency axes by using predetermined carriers each corresponding thereto, and outputting the same as modulated signals; and
  transmission amplifier means for amplifying said modulated signals to be in a predetermined amplitude, and outputting the same to said transmission path, and said reception apparatus comprises:
  reception amplifier means for amplifying, to be in a predetermined amplitude, and outputting the modulated signals received through said transmission path;
  demodulation means for subjecting the modulated signals outputted from said reception amplifier means to amplitude-modulation and/or phase-demodulation by using predetermined reference carriers each corresponding thereto, and then generating n-type amplitude/phase information streams;
  de-interleave means for unshuffling the symbols in said n-type amplitude/phase information streams generated by said demodulation means in an inverse manner to the interleave means, and then outputting the unshuffled n-type amplitude/phase information streams; and
  determination means for determining a value respectively for said 1st to mth symbols according to each information on said unshuffled n-type amplitude/phase information streams outputted from said de-interleave means.

2. The power-line carrier communications system as claimed in claim 1, wherein said determination means calculates an average value of amplitude information and/or phase information within a predetermined threshold value from kth (where k is an integer equal to or less than m) amplitude information and/or phase information in said unshuffled n-type amplitude/phase information streams, and then determining a value of a kth symbol according to the average value.

3. The power-line carrier communications system as claimed in claim 1, wherein, from kth (where k is an integer equal to or less than m) amplitude information and/or phase information in said unshuffled n-type amplitude/phase information streams, said determination means
  calculates an amplitude average value of the amplitude/phase information streams transmitted with the same carrier,
  calculates relative amplitude information for said amplitude average value,
  determines a degree of reliability based on whether or not a value of said relative amplitude information is within a predetermined range, and
  calculates an average value by using only reliable amplitude information and/or phase information, and then
  determines a value of a kth symbol according to the average value.

4. The power-line carrier communications system as claimed in claim 1, wherein, from kth (where k is an integer equal to or less than m) amplitude information and/or phase information in said unshuffled n-type amplitude/phase information streams, said determination means
  calculates amplitude average and distribution values of the amplitude/phase information streams transmitted with the same carrier,
  calculates relative amplitude information for said amplitude average value,
  determines a degree of reliability based on whether or not an absolute value of said relative amplitude information is smaller than an absolute value obtained by multiplying said distribution value by a predetermined constant, and
  calculates an average value by using only reliable amplitude information and/or phase information, and then
  determines a value of a kth symbol according to the average value.

5. The power-line carrier communications system as claimed in claim 1, wherein, from kth (where k is an integer equal to or less than m) amplitude information and/or phase information in said unshuffled n-type amplitude/phase information streams, said determination means
  determines a degree of reliability whether or not a difference between an amplitude value of symbol the amplitude/phase information streams transmitted and an amplitude value of a preceding symbol, with the same carrier, is within a predetermined value, and
  calculates an average value by using only reliable amplitude information and/or phase information, and then
  determines a value of a kth symbol according to the average value.

6. The power-line carrier communications system as claimed in claim 1, wherein said symbol stream having 1st to mth symbols in said interleave means is equal to or less than a half power-supply cycle time.

7. The power-line carrier communications system as claimed in claim 2, wherein said symbol stream having 1st to mth symbols in said interleave means is equal to or less than a half power-supply cycle time.

8. The power-line carrier communications system as claimed in claim 3, wherein said symbol stream having 1st to mth symbols in said interleave means is equal to or less than a half power-supply cycle time.

9. The power-line carrier communications system as claimed in claim 4, wherein said symbol stream having 1st to mth symbols in said interleave means is equal to or less than a half power-supply cycle time.

10. The power-line carrier communications system as claimed in claim 5, wherein said symbol stream having 1st to mth symbols in said interleave means is equal to or less than a half power-supply cycle time.

11. The power-line carrier communications system as claimed in claim 1, wherein said modulation means modulates in an OFDM scheme, and
said demodulation means demodulates in the OFDM scheme.

12. The power-line carrier communications system as claimed in claim 2, wherein said modulation means modulates in an OFDM scheme, and
said demodulation means demodulates in the OFDM scheme.

13. The power-line carrier communications system as claimed in claim 3, wherein said modulation means modulates in an OFDM scheme, and
said demodulation means demodulates in the OFDM scheme.

14. The power-line carrier communications system as claimed in claim 4. wherein said modulation means modulates in an OFDM scheme, and
said demodulation means demodulates in the OFDM scheme.

15. The power-line carrier communications system as claimed in claim 5, wherein said modulation means modulates in an OFDM scheme, and
said demodulation means demodulates in the OFDM scheme.

16. The power-line carrier communications system as claimed in claim 6, wherein said modulation means modulates in an OFDM scheme, and
said demodulation means demodulates in the OFDM scheme.

17. The power-line carrier communications system as claimed in claim 7, wherein said modulation means modulates in an OFDM scheme, and
said demodulation means demodulates in the OFDM scheme.

18. The power-line carrier communications system as claimed in claim 8, wherein said modulation means modulates in an OFDM scheme, and
said demodulation means demodulates in the OFDM scheme.

19. The power-line carrier communications system as claimed in claim 9, wherein said modulation means modulates in an OFDM scheme, and
said demodulation means demodulates in the OFDM scheme.

20. The power-line carrier communications system as claimed in claim 10, wherein said modulation means modulates in an OFDM scheme, and
said demodulation means demodulates in the OFDM scheme.

21. A power-line carrier communications system in which a power-line is used for a transmission path, and a symbol is transmitted from a transmission apparatus to a reception apparatus, wherein:
said transmission apparatus comprises:
interleave device operable to shuffle m symbols (where m is an integer of 2 or more) in a unit of symbol stream in n ways (where n is an integer of 2 or more) and generate n-type symbol streams in which 1st to mth symbols are shuffled;
modulation device operable to subject the n-type symbol streams generated by said interleave device to amplitude-modulation and/or phase-modulation in such a manner as to randomly distribute each symbol on both time and frequency axes by using predetermined carriers each corresponding thereto, and outputting the same as modulated signals; and
transmission amplifier device operable to amplify the modulated signals to be in a predetermined amplitude, and output the same to said transmission path; and
said reception apparatus comprises:
reception amplifier device operable to amplify, to be in a predetermined amplitude, and output the modulated signals received through said transmission path;
demodulation device operable to subject the modulated signals outputted from said reception amplifier device to amplitude-modulation and/or phase-demodulation by using predetermined reference carriers each corresponding thereto, and then generating n-type amplitude/phase information streams;
de-interleave device operable to unshuffle the symbols in the n-type amplitude/phase information streams generated by said demodulation device in an inverse manner to the interleave device, and then output the unshuffled n-type amplitude/phase information streams; and
determination device operable to determine a value respectively for the 1st to mth symbols according to each information on the unshuffled n-type amplitude/phase information streams outputted from said de-interleave device.

22. The power-line carrier communications system as claimed in claim 21, wherein said determination device is operable to calculate an average value of amplitude information and/or phase information within a predetermined threshold value from kth (where k is an integer equal to or less than m) amplitude information and/or phase information in the unshuffled n-type amplitude/phase information streams, and then determine a value of a kth symbol according to the average value.

23. The power-line carrier communications system as claimed in claim 21, wherein, from kth (where k is an integer equal to or less than m) amplitude information and/or phase information in the unshuffled n-type amplitude/phase information streams, said determination device is operable to:
calculate an amplitude average value of the amplitude/phase information streams transmitted with the same carrier,
calculate relative amplitude information for the amplitude average value;
determine a degree of reliability based on whether or not a value of the relative amplitude information is within a predetermined range; and
calculate an average value by using only reliable amplitude information and/or phase information, and then determine a value of a kth symbol according to the average value.

24. The power-line carrier communications system as claimed in claim 21, wherein, from kth (where k is an integer equal to or less than m) amplitude information and/or phase information in the unshuffled n-type amplitude/phase information streams, said determination device is operable to:

calculate amplitude average and distribution values of the amplitude/phase information streams transmitted with the same carrier;

calculate relative amplitude information for the amplitude average value;

determine a degree of reliability based on whether or not an absolute value of the relative amplitude information is smaller than an absolute value obtained by multiplying the distribution value by a predetermined constant; and calculate an average value by using only reliable amplitude information and/or phase information, and then determine a value of a kth symbol according to the average value.

25. The power-line carrier communications system as claimed in claim 21, wherein, from kth (where k is an integer equal to or less than m) amplitude information and/or phase information in the unshuffled n-type amplitude/phase information streams, said determination device is operable to:

determine a degree of reliability whether or not a difference between an amplitude value of symbol the amplitude/phase information streams transmitted and an amplitude value of a preceding symbol, with the same carrier, is within a predetermined value; and calculate an average value by using only reliable amplitude information and/or phase information, and then determine a value of a kth symbol according to the average value.

26. The power-line carrier communications system as claimed in claim 21, wherein the symbol stream having 1st to mth symbols in said interleave device is equal to or less than a half power-supply cycle time.

27. The power-line carrier communications system as claimed in claim 22, wherein the symbol stream having 1st to mth symbols in said interleave device is equal to or less than a half power-supply cycle time.

28. The power-line carrier communications system as claimed in claim 23, wherein the symbol stream having 1st to mth symbols in said interleave device is equal to or less than a half power-supply cycle time.

29. The power-line carrier communications system as claimed in claim 24, wherein the symbol stream having 1st to mth symbols in said interleave device is equal to or less than a half power-supply cycle time.

30. The power-line carrier communications system as claimed in claim 25, wherein the symbol stream having 1st to mth symbols in said interleave device is equal to or less than a half power-supply cycle time.

31. The power-line carrier communications system as claimed in claim 21, wherein said modulation device is operable to modulate in an OFDM scheme; and said demodulation device is operable to demodulate in the OFDM scheme.

32. The power-line carrier communications system as claimed in claim 22, wherein said modulation device is operable to modulate in an OFDM scheme; and said demodulation device is operable to demodulate in the OFDM scheme.

33. The power-line carrier communications system as claimed in claim 23, wherein said modulation device is operable to modulate in an OFDM scheme; and said demodulation device is operable to demodulate in the OFDM scheme.

34. The power-line carrier communications system as claimed in claim 24, wherein said modulation device is operable to modulate in an OFDM scheme; and said demodulation device is operable to demodulate in the OFDM scheme.

35. The power-line carrier communications system as claimed in claim 25, wherein said modulation device is operable to modulate in an OFDM scheme; and said demodulation device is operable to demodulate in the OFDM scheme.

36. The power-line carrier communications system as claimed in claim 26, wherein said modulation device is operable to modulate in an OFDM scheme; and said demodulation device is operable to demodulate in the OFDM scheme.

37. The power-line carrier communications system as claimed in claim 27, wherein said modulation device is operable to modulate in an OFDM scheme; and said demodulation device is operable to demodulate in the OFDM scheme.

38. The power-line carrier communications system as claimed in claim 28, wherein said modulation device is operable to modulate in an OFDM scheme; and said demodulation device is operable to demodulate in the OFDM scheme.

39. The power-line carrier communications system as claimed in claim 29, wherein said modulation device is operable to modulate in an OFDM scheme; and said demodulation device is operable to demodulate in the OFDM scheme.

40. The power-line carrier communications system as claimed in claim 30, wherein said modulation device is operable to modulate in an OFDM scheme; and said demodulation device is operable to demodulate in the OFDM scheme.

* * * * *